(12) United States Patent
Assouad et al.

(10) Patent No.: US 8,285,981 B2
(45) Date of Patent: Oct. 9, 2012

(54) REMOTE NETWORK DEVICE PROVISIONING

(75) Inventors: Simon Assouad, Irvine, CA (US); Hemal Shah, Trabuco Canyon, CA (US)

(73) Assignee: Broadcom Corporation, Irvine, CA (US)

(*) Notice: Subject to any disclaimer, the term of this patent is extended or adjusted under 35 U.S.C. 154(b) by 631 days.

(21) Appl. No.: 11/821,859

(22) Filed: Jun. 26, 2007

(65) Prior Publication Data

US 2008/0229089 A1 Sep. 18, 2008

Related U.S. Application Data

(60) Provisional application No. 60/906,920, filed on Mar. 14, 2007.

(51) Int. Cl.
*G06F 9/00* (2006.01)
(52) U.S. Cl. .................. 713/100; 713/1; 713/2
(58) Field of Classification Search .................. 713/1, 2, 713/100
See application file for complete search history.

(56) References Cited

U.S. PATENT DOCUMENTS

| | | | |
|---|---|---|---|
| 5,968,116 A * | 10/1999 | Day et al. ....................... 709/202 |
| 6,345,294 B1 * | 2/2002 | O'Toole et al. ................ 709/222 |
| 6,574,664 B1 * | 6/2003 | Liu et al. ........................ 709/224 |
| 6,934,853 B2 * | 8/2005 | Christopherson et al. ........ 726/6 |
| 7,127,597 B2 * | 10/2006 | Backman et al. .................. 713/1 |
| 7,240,102 B1 * | 7/2007 | Kouznetsov et al. .......... 709/220 |
| 7,363,514 B1 * | 4/2008 | Behren ............................. 713/2 |
| 7,626,944 B1 * | 12/2009 | Riddle ........................... 370/254 |
| 2004/0034763 A1 * | 2/2004 | McCardle ......................... 713/1 |
| 2004/0193867 A1 * | 9/2004 | Zimmer et al. .................... 713/2 |
| 2005/0198629 A1 * | 9/2005 | Vishwanath ................... 717/174 |
| 2006/0242396 A1 * | 10/2006 | Cartes et al. ...................... 713/1 |
| 2007/0038698 A1 * | 2/2007 | Peterson ........................ 709/203 |

* cited by examiner

*Primary Examiner* — Paul Yanchus, III
(74) *Attorney, Agent, or Firm* — Brake Hughes Bellermann LLP

(57) ABSTRACT

Various embodiments are disclosed relating to remote network device provisioning. A method is disclosed, the method comprising discovering a network address associated with a device on a network based on a discovery response received in response to a discovery request provided to the device. One or more configurable boot options associated with the device may be determined based at least in part on the discovery response. One or more of the configurable boot options may be configured on the device, wherein, upon reboot of the device using the configured boot options, a software image is provided to the device.

14 Claims, 4 Drawing Sheets

300

REMOTE NETWORK DEVICE PROVISIONING

CROSS-REFERENCE TO RELATED APPLICATIONS

This application claims priority to U.S. Provisional Application Ser. No. 60/906,920, filed on Mar. 14, 2007, entitled "Remote Network Device Provisioning," hereby incorporated by reference.

TECHNICAL FIELD

This description relates to remote network device provisioning.

BACKGROUND

Network devices such as computers, personal digital assistants (PDAs) and others are often received from manufacturers with default configurations. Organizations however, especially large organizations, prefer and often require that employees with similar duties have access to similar, if not identically configured devices especially tailored to the organization's needs. As such, oftentimes such devices after being received from the manufacturers must be configured or reconfigured to meet the standards set forth by the organization. Having identical devices reduces not only the cost of configuring the devices, as each may be configured with a similar image, but also reduces the cost in training new employees to operate the standard device configurations.

A standard image with which a network device may be configured may include, for example, an operating system and one or more applications anticipated to be needed by the employee for which the device may be intended. Furthermore the device itself may need to be configured to be consistent with an organization's own internal policy. For example, an organization may not allow its employees to listen to music on company devices, thus perhaps the speakers of a laptop may need to be disabled.

The devices may be configured manually, whereby an administrator or other user may need to physically handle the device, assign it a network address, load one or more images onto the device, from a CD-ROM for example and manually configuring one or more components of the device, all depending on the intended use of the device.

Automating the configuration process however, where devices may be remotely configured via a network, may not only save time and money, but also ensure that devices intended for similarly situated employees are identically configured (rather than being subject to a potential for human error). Furthermore devices located in remote destinations or office locations may be remotely configured upon gaining access to the network.

However it may occur that an organization's standard image for a device may include proprietary, classified or otherwise sensitive information on the standard images. Then for example, it may be useful to have an automated configuration process that may differentiate between security levels and configure the network devices with one or more images depending on various security considerations.

SUMMARY

According to an example embodiment, a method is disclosed. A network address associated with a device on a network may be discovered based on a discovery response received in response to a discovery request provided to the device. One or more configurable boot options associated with the device may be determined based at least in part on the discovery response. One or more of the configurable boot options may be configured on the device wherein, upon reboot of the device using the configured boot options, a software image is provided to the device.

According to another example embodiment a method is disclosed. A provisioning image, including a provisioning agent and security credentials, may be provided to a device based at least in part on an automated discovery of a network address associated with the device. The device may be authenticated based at least in part on the security credentials as provided by the provisioning agent. The device may be configured, via secured communication based upon the authentication, with a software image, including an operating system and one or more applications.

According to another example embodiment, a system is disclosed. An address server may be configured to assign a network address to a device on a network in response to an address request broadcast by a network interface service associated with the device. A discovery engine may be configured to discover the network address associated with the device, based on a discovery response received in response to a discovery request transmitted to one or more network addresses associated with the network, including the network address assigned to the device. A boot console may be adapted to configure one or more configurable boot options on the device. A provisioning server may be configured to provide, following a boot of the device based upon a configuration of the one or more configurable boot options, a provisioning image including a provisioning agent and security credentials to the device. A software image server may be configured to provide, via secured communication based upon an authentication of the security credentials as provided by the provisioning agent, an encrypted software image to the device.

The details of one or more implementations are set forth in the accompanying drawings and the description below. Other features will be apparent from the description and drawings, and from the claims.

DETAILED DESCRIPTION

Figure 1:
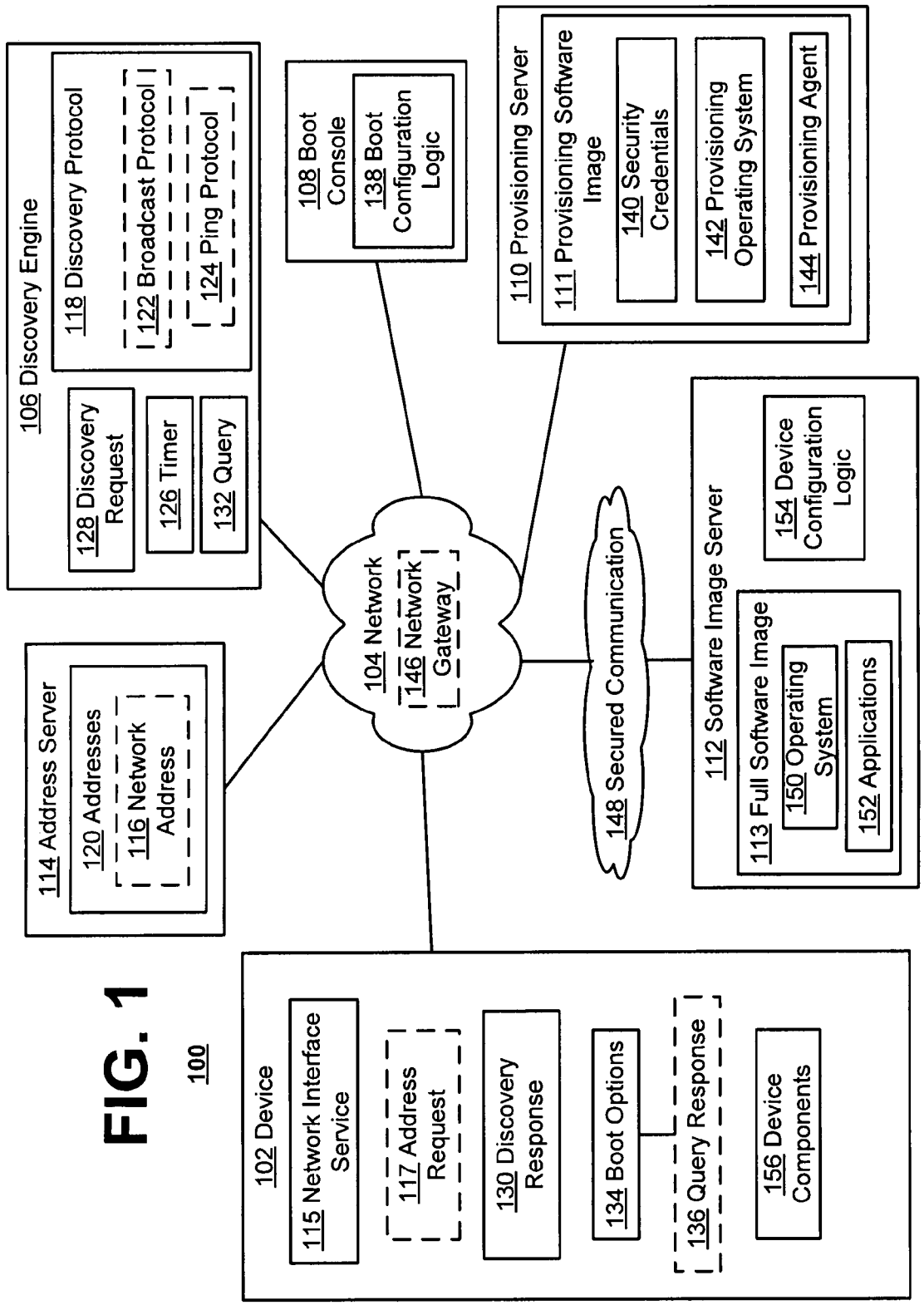
FIG. 1 is a block diagram of an example system 100 for the remote provisioning of a device on a network, according to an example embodiment.

FIG. 1 is a block diagram of an example system 100 for the remote provisioning of a device on a network. In the example of FIG. 1, the system 100 may allow a device (e.g., device 102) to be remotely provisioned and configured via a network (e.g., network 104). The device may be connected to the network and powered on, whereby system 100 may, without further user interference or interaction, determine a location of the device on the network, make a determination regarding the configurability of the device and remotely configure the device with a first software image. According to an example embodiment, the first software image may include a standard image to be loaded onto the device, including for example a full suite of software products, whereby upon configuring the device with the first software image, the device may be fully operable.

According to another example embodiment, where security and/or the integrity of the standard image may be of greater concern, the first software image may be an interim software image and include security information. Then for example, system 100 may authenticate the device based at least in part upon the security information provided with the first software image prior to installing the standard image. After verification and/or authentication of the device, system 100 may then remotely and securely configure the device with a second, more complete software image, including for example the standard image, whereby upon configuration, the device may be ready for operation by an anticipated user. It may be, according to another example embodiment, that multiple standard images exist, and that which image a device receives may be dependent upon the anticipated usage of the device.

System 100 may include a device 102. Device 102 may include any device adaptable to be remotely configured. For example, device 102 may include a laptop computer, desktop computer, personal digital assistant (PDA), mobile phone or other device remotely configurable via a network 104.

The network 104 may include one or more communication mediums whereby two or more devices may communicate with one another. For example network 104 may include a computer network, including a wireless network, the Internet, an intranet, a telecommunications network and/or any other configuration of one or more communication mediums capable of providing communication between two or more network devices.

As referenced above, system 100 may be or may include a discovery engine 106. Discovery engine 106 may, without user interaction, discover or otherwise determine a location, address or other identifier associated with a network device. For example, discovery engine 106 may discover an IP (internet protocol) address assigned to device 102 on network 104, by sending messages to one or more IP addresses associated with network 104. Then for example, discovery engine 106 may listen or otherwise wait for a response to one or more of the sent messages, indicating the IP address of device 102. For example, device 102 may have received one or more of the messages sent by discovery engine 106 and responded with one or more messages including its IP address.

Discovery engine 106 may make a determination regarding the configurability of device 102. For example, as discussed above, for system 100 to configure or provide device 102 with a software image, device 102 may need to be remotely configurable. To determine whether device 102 is remotely configurable, discovery engine 106 may exchange one or more messages regarding configurability with device 102, then for example, based on the responses the configurability determination may be made. According to another example, the messages regarding configurability may be included in the messages sent by discovery engine 106 in determining the location of device 102, as discussed above.

Based on the configurability determination, a boot console 108 may then configure device 102. For example, boot console 108 may configure boot settings associated with device 102, whereby upon booting based upon the configured boot settings, device 102 may boot to a server. In another example embodiment, boot console 108 may configure other settings and/or may configure multiple boot settings of device 102. For example, boot console 108 may not only configure boot settings for the next boot of device 102, but also one or more subsequent boots of device 102.

A provisioning server 110 may provide and/or configure a network device with a first and/or interim software image. Provisioning server 110 may include for example, a preboot execution environment (PXE) configured to bootstrap device 102 using a network interface card. Device 102 may boot, based on the boot settings as configured by boot console 108, to provisioning server 110. Then for example, provisioning server 110 may configure device 102 with a provisioning software image 111.

Provisioning software image 111 may include a first, minimal and/or interim software image. For example, provisioning software image 111 may include a minimized suite of applications configured and security information by which device 102, once configured with provisioning software image 111, may be authenticated and provided a more complete and/or standard image. According to another example embodiment, provisioning software image 111 may include the standard image, especially in those situations where security of the standard image and/or unauthorized users may not be as of great of a concern.

Software image server 112 may remotely provide and/or configure device 102 with a second and/or more complete software image. For example, prior to communicating with software image server 112, security information associated with device 102 may need to be verified. Then for example, software image server 112 may include remotely and securely load a full software image 113, for example the standard image, on device 102.

Full software image 113 may include a second and/or complete software image to be loaded on a network device. For example, as discussed above, full software image 113 may include the standard image. Also as discussed above, provisioning software image 111 may include an interim image including security information provided to device 102, whereby upon verification of the security information (i.e. authorization of device 102) device 102 may be provided and/or configured with full software image 113. In other example embodiments, there may exist multiple versions of full software image 113, whereby software image server 112 may determine the proper version to provide to device 102 based upon the anticipated use of device 102.

Device 102 when connected to network 104 may for example come directly from the manufacturer and/or be otherwise may include a memory that has been reformatted, in which case device 102 may not have an operating system or other application loaded on it other than a basic input/output system (BIOS). In another example embodiment device 102 may already have one or more applications installed on it and would like full software image 113 to replace its current configuration. In either case, device 102 may communicate with network 104 through a network interface service 115. In the case of device 102 only including a BIOS, network interface service 115 may include an out-of-band service residing on a network controller associated with device 102 and configured to handle the communications between device 102 and network 104. In the case where device 102 already has an existing operating system, network interface service 115 may be included as a function or program that executes when device 102 is powered on and the operating system loads.

Network interface service 115 may initiate and/or respond to communication with one or more network devices via a network. For example, network interface service 115 may respond to messages received from discovery engine 106. In another example embodiment, network interface service 115 may broadcast to one or more devices, an address request 117 via the network 104.

Address request 117 may include a request to be assigned a network identifier, such as for example, an address, network ID or other identifier. For example, upon being connected to network 104, device 102 may not have an IP address identifying it on network 104. Then for example, network interface service 115 may broadcast address request 117 via network 104, from which it may be received by an address server 114.

Address server 114 may receive address request 117 and may respond by assigning an identifier on network 104 to device 102. For example, addresser server may include a dynamic host configuration protocol (DHCP) whereby device 102 may request an IP address. Address server 114 may determine a network identifier for a device (e.g. 102) connected to network 104. For example, address server 114 may assign to device 102, an available (or predetermined) network address 116.

Network address 116 may identify device 102 on network 104. For example, network address 116 may include an internet protocol (IP) address, media access control (MAC) address, location or other identifier assigned to device 102. For example, address server 114 may assign network address 116 to device 102 in response to receiving address request 117. Network address 116 may then be used for example by other network devices to send messages to and/or respond to messages sent by device 102 via network 104.

According to other example embodiments, network address 116 may be manually assigned or provided to device 102. For example, s network administrator may determine and assign network address 116 to device 102. Or for example, network address 116 may be predetermined and device 102 may be preconfigured with network address 116 by the manufacturer. In other example embodiments, additional and/or different processes may be used to assign network address 116 to device 102.

Discovery engine 106 may then discover or otherwise determine which network address (e.g. 116) was assigned to or associated with device 102. For example, using a discovery protocol 118, discovery engine 106 may send one or more messages to one or more addresses 120 associated with network 104. Discovery engine 106 may then listen or otherwise wait for one or more responses from which to determine that network address 116 is associated with device 102.

Discovery protocol 118 may include a protocol or other procedure for automatically (i.e. without network administrator or other user interaction) discovering an address, location or other identifier of a network device. For example, discovery engine 106 may transmit discovery messages to one or more addresses 120 associated with network 104, using discovery protocol 118. Discovery protocol 118 may also dictate that discovery engine 106 periodically retransmit one or more of the discovery messages. Then for example, based upon one or more responses to the discovery messages, discovery engine 106 may determine that network address 116 is associated with device 102.

Addresses 120 may include one or more addresses associated with network 104. For example, addresses 120 may include available and/or assigned network addresses associated with one or more devices on network 104. For example, address server 114 may select network address 116 from addresses 120, to assign to device 102. In another example embodiment, addresses 120 may include network addresses already assigned to one or more devices on network 104.

Then for example, a discovery engine 106 may transmit a discovery message, using discovery protocol 118, to one or more of addresses 120.

Discovery protocol 118 may include a broadcast protocol 122 and/or a ping protocol 124. Broadcast protocol 122 may include broadcasting a discovery message from discovery engine 106 to multiple addresses (e.g. 120) associated with network 104 to determine the network address (e.g. 116) associated with device 102. For example, broadcast protocol 122 may call for simultaneously, or concurrently transmitting a discovery message to a plurality of the addresses 120. Then for example, discovery engine 106 may wait for a response to one or more of the discovery messages.

Ping protocol 124 may include pinging one or more devices or addresses (e.g. 120) associated with network 104 with a discovery message. For example, discovery engine 106, using ping protocol 124, may ping with a discovery message one or more of addresses 120, including network address 116, and listen for a ping response. If no ping response is received within a time period, or if the response received was not the response desired, discovery engine 106 may then ping a second address of addresses 120. In other example embodiments, even if a ping response is received within the time period, discovery engine 106 may continue sweeping through and pinging one or more of addresses 120.

Discovery protocol 118, including broadcast protocol 122 and ping protocol 124, may be either a one-time or periodic protocol. For example, if broadcast protocol 122 is a one-time protocol, then after a single broadcast discovery message, discovery engine 106 may not rebroadcast another discovery message. If however, broadcast protocol 122 is periodic, then after the expiration of a period of time, as determined by a timer 126, discovery engine 106 may rebroadcast a discovery message.

Timer 126 may determine and/or count a period of time associated with discovery protocol 118, including broadcast protocol 122 and ping protocol 124. For example, timer 126 may determine how long discovery engine 106 listens for responses between pinging devices using ping protocol 124. Timer 126 may determine how long discovery engine 106 waits in between initiating various ping sweeps using ping protocol 124, if periodic.

As discussed above, discovery engine 106 may transmit or send a discovery message, or discovery request 128 to one or more devices on network 104 using discovery protocol 118. Discovery request 128 may include a message, packet or other signal sent to one or more devices (e.g. 102) via network 104 requesting a response from one or more devices (e.g. 102) acknowledging their location and/or status on network 104. For example, discovery engine 106 may transmit discovery request 128, via network 104, using broadcast protocol 122. Then for example, discovery request 128 may be received by device 102, which may respond with discovery response 130.

Discovery response 130 may include a message, packet or other signal including at least a location or identifier associated with a network device. For example, discovery response 130 may be received by discovery engine 106 in response to discovery request 128, and may include network address 116. Then for example discovery engine 106 may determine, from discovery response 130, that network address 116 is associated with device 102. Discovery engine 106 may then provide a query 132 to device 102.

Query 132 may include a message, packet or other signal regarding to the configurability of a network device. For example, query 132 may inquire as to whether device 102, or the boot options 134 thereof, may be remotely configured via network 104.

Boot options 134 may include configurable boot settings of a network device (e.g. 102), whereby upon a boot or reboot of the device, the device may boot based on the boot options. Boot options 134 may include for example, a configurable boot specification of a BIOS on device 102. For example, boot options 134 may include 'boot from hard disk', 'boot from CD' and 'boot from PXE'. Then for example, query 132 may inquire as to whether boot options 134 are remotely configurable via network 104.

In response to query 132, discovery engine 106 may receive query response 136. Query response 136 may include a message, packet or other signal associated with the configurability of device 102. For example, query response 136 may include whether boot options 134 are remotely configurable via network 104.

According to another example embodiment, query response 136 may be included in discovery response 130. For example, a discovery request 128 ping, by discovery engine 106, received by device 102 may include query 132. Then for example, along with including network address 116 with discovery response 130, device 102 may also include query response 136.

Upon a determination that boot options 134 are remotely configurable via network 104, boot configuration logic 138 of boot console 108 may configure boot options 134. Boot configuration logic 138 may configure a network device to boot to, communicate with and/or otherwise locate a server or other network device during one or more future boots. For example, boot configuration logic 138 may configure boot options 134 of device 102, whereby upon reboot, device 102 may boot to provisioning server 110.

Provisioning server 110 may configure device 102 with provisioning software image 111. Provisioning software image 111 may include security credentials 140, provisioning operating system 142 and provisioning agent 144. Security credentials 140 may include security information associated with communicating securely and accessing full software image 113. For example, security credentials 140 may include an identification, pass-code or password, encryption information and/or other security information associated with at least a portion of network 104.

Provisioning operating system 142 may include a operating system configured to support one or more agents, applications or programs. Provisioning operating system 142 for example may include a minimized, optimized or otherwise smaller operating system, such as Windows PE™, requiring less resources (when compared to a fuller version of an operating system) to provide to and/or configure on device 102. In another example embodiment, provisioning operating system 142 may include a full version of an operating system. Provisioning operating system 142 may be configured to support one or more programs associated with security credentials 140, such as provisioning agent 144.

Provisioning agent 144 may include an agent, application or other program configured to communicate with one or more network devices. Provisioning agent 144 may for example be configured to locate and communicate with a network gateway 146. Such communication may include for example exchanging security credentials 140 with network gateway 146, via network 104.

Network gateway 146 may authenticate a network device to communicate securely. For example, network gateway 146 may verify security credentials 140 as exchanged with provisioning agent 144 and may authenticate device 102 to use or otherwise access secured communication 148 to communicate with software image server 112. In another example embodiment, network gateway 146 may authenticate device 102 based on additional and/or different information exchanged with device 102, including security credentials 140.

Secured communication 148 may include a secured link, network or other channel, including wireless channel, where signals or messages may be securely communicated between two or more devices. For example, secured communication 148, in addition to requiring authentication that may be provided by network gateway 146, may include the transmission of encrypted messages. For example, software image server 112 may encrypt and provide full software image 113, including an operating system 150 and one or more applications 152, via secured communication 148 to device 102. Then for example, provisioning agent 144 may decode the encrypted messages based at least in part on security credentials 140.

Operating system 150 may include an operating system configured to manage the hardware and/or software resources of a network device. For example, operating system 150 may include, for example, Windows™, Linux™ or another operating system. If previously configured with provisioning software image 111, operating system 150 may replace provisioning operating system on device 102. In other example embodiments, full software image 113 may include multiple operating systems 150 to be portioned on device 102.

Applications 152 may include one or more applications or other programs to be included on a configured network device. For example, applications 152 may include proprietary applications used or anticipated to be used during the operation of device 102. Applications 152 may include for example, word processing, spreadsheet, games, graphics, internet, accounting, database and/or other applications. Applications 152 may include applications, applets and/or other programs downloadable from the Internet or another source.

In addition to and/or in lieu of providing full software image 113 to device 102, software image server 112 may configure device 102 with full software image 113. For example, software image server 112 may load operating system 150 and install applications 152 onto device 102. Software image server 112 may download or update device 102 with applications not expressly provided on full software image 113.

Device configuration logic 154 may configure one or more features of device 102. Device configuration logic 154 may configure one or more hardware, firmware and/or software features or components of a network device. For example, device configuration logic 154 may remotely configure device components 156 of device 102 via network 104.

Device components 156 may include one or more hardware, software, firmware and/or other components or features associated with device 102. Example device components 156 may include speakers, microphones, monitors, user interface devices, memory, network devices and/or other components. One or more of device components 156 may be remotely configurable by device configuration logic 154. For example, device configuration logic 154 may disable the speakers (e.g. device components 156) of device 102 and/or configure device 102 to print to a network printer (not shown).

As referenced above, system 100 may be configurable depending upon varying security requirements. For example, provisioning software image 111 may include a first set of security credentials 140, which must be verified, prior to providing full software image 113, which may include more sensitive or proprietary information, via secured communication 148.

According to other example embodiments however, system 100 may be configurable to include varying levels of security at different stages of the provisioning process. For example, there may be a first level of security prior to providing network address 116 to device 102, or even prior to device 102 gaining access to network 104. Secured communication 148, may then for example, provide a heightened level of security when compared to that of network 104. In other example embodiments however, secured communication 148 may provide no extra level of security, as whatever security as implemented by network 104 may be deemed sufficient. In such example embodiments then, full software image 113 may include additional and/or different applications 152 not included with provisioning software image 111.

System 100 may allow virtually any device with network access to be remotely and securely provisioned via the network. The device may be provided with a network address, discovered, configured and provided with one or more software images. This may allow not only flexibility in the provisioning process but also increased savings in the amount of time, error and other costs generally associated with similarly provisioning multiple devices.

Figure 2:
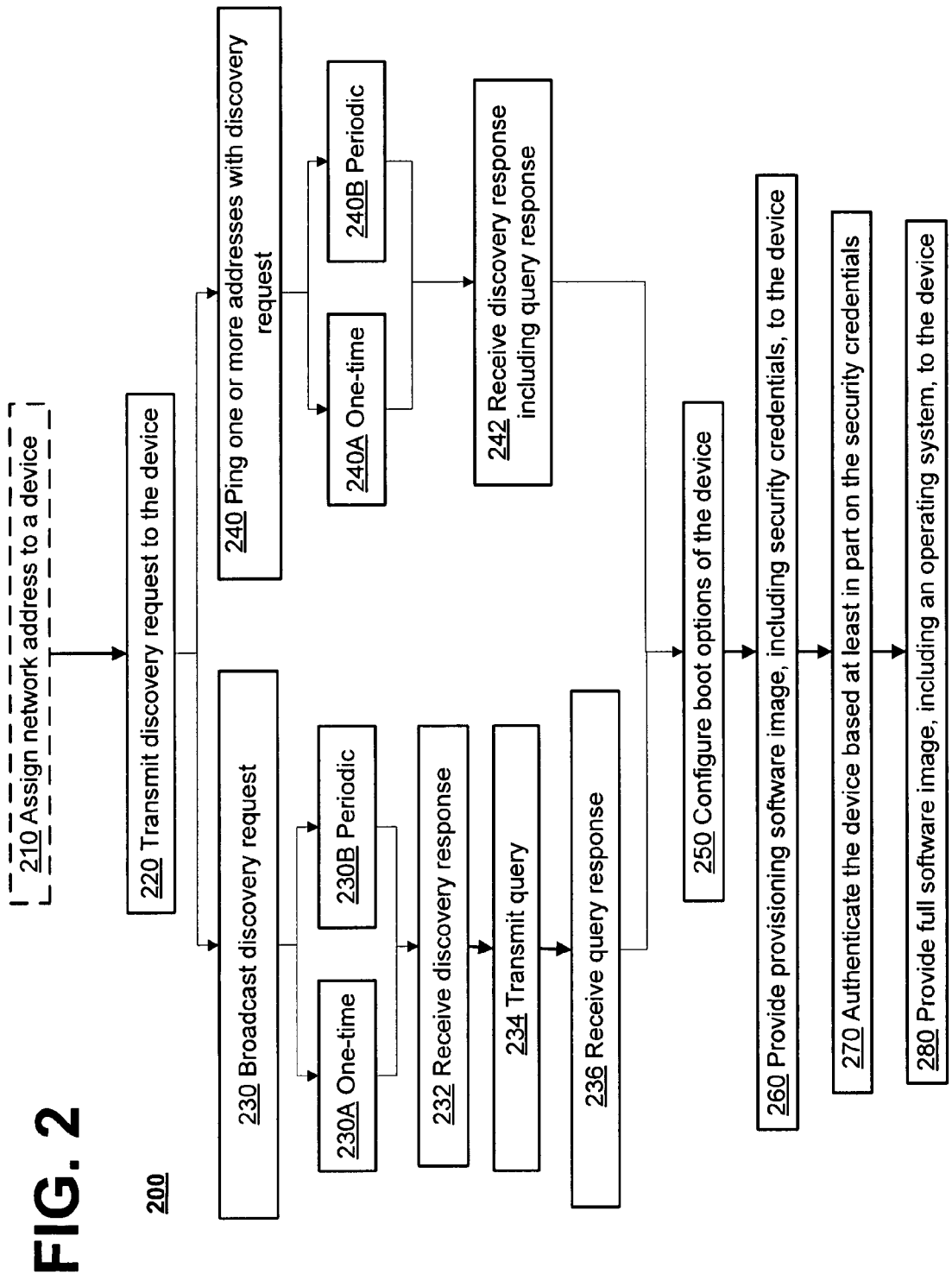
FIG. 2 is a flow chart illustrating the remote provisioning of a device via a network according to an example embodiment.

FIG. 2 is a flow chart illustrating the remote provisioning of a device via a network according to an example embodiment.

At 210, a network address may be assigned to a device. For example, address server 114 may assign network address 116 to device 102. According to an example embodiment, address server 114 may assign network address 116 in response to the receipt of address request 117. In other example embodiments, device 102 may be manually configured with network address 116.

At 220, a discovery request may be transmitted. For example, discovery engine 106 may transmit discovery request 128 using discovery protocol 118. The discovery request may be transmitted using either broadcast protocol 122 or ping protocol 124.

At 230, the discovery request may be broadcast either one time (230A) or periodically (230B). For example, discovery engine 106 may broadcast discovery request 128 one-time using broadcast protocol 122. Or for example, discovery engine 106 may broadcast discovery request 128 periodically, upon the expiration of timer 126 which may determine the time elapsed between subsequent broadcasts.

At 232, a discovery response may be received. For example, discovery engine 106 may receive discovery response 130. According to an example embodiment, device 102 (e.g. network interface service 115) may transmit discovery response 130 in response to the receipt of discovery request 128. Discovery response 130 may include at least a reference to network address 116, whereby discovery engine 106 may determine, based on discovery response 130, that network address 116 is associated with device 102.

At 234, a query may be transmitted. For example, discovery engine 106 may transmit query 132, via network 104, to device 102.

At 236, a query response may be received. For example, discovery engine 106 may receive query response 136. Query response 136 may be provided by device 102 (e.g. network interface service 115) in response to the receipt of query 132, whereby query response 136 may include configurability information associated with boot options 134.

At 240, one or more addresses may be pinged, either once (240A) or periodically (240B), with a discovery request. For example, discovery engine 106 may ping, using ping protocol 124, one or more of addresses 120, including network address 116, with discovery request 128. Then for example, if multiple addresses are to be pinged (i.e. a ping sweep to be performed with multiple addresses), then timer 126 may determine the time to wait between pinging successive addresses during the course of a ping sweep.

Or for example, discovery engine 106 may periodically ping, using ping protocol 124, one or more of addresses 120, including network address 116, with discovery request 128. Then for example, timer 126 may determine the time to wait between successive ping sweeps.

At 242, a discovery response including a query response may be received. For example, discovery engine 106 may receive discovery response 130 including both network address 116 and query response 136. According to an example embodiment, discovery engine 106 may ping device 102 with discovery request 128 including query 132. Then for example, discovery engine 106 may receive discovery response 130 including query response 136 may be received in response to the ping.

At 250, boot options of the device may be configured. For example, boot configuration logic 138, of boot console 108, may configure boot options 134, based at least in part on a determination, based at least in part on query response 136, that boot options 134 are remotely configurable.

At 260, a provisioning software image, including security credentials may be provided to the device. For example, provisioning server 110 may provide device 102 with provisioning software image, including security credentials 140. According to an example embodiment, device 102 may boot to provisioning server 110 based on boot options 134, as configured by boot console 108, then for example, provisioning server 110 may configure device 102 with provisioning software image 111.

At 270, the device may be authenticated based at least in part on the security credentials. For example, network gateway 146 may authenticate device 102 to communicate via secured communication 148 with software image server 112, based at least in part on security credentials 140. According to an example embodiment, network gateway 146 may exchange security information, including security credentials 140, with provisioning agent 144.

At 280, a full software image, including an operating system, may be provided to the device. For example, software image server 112 may provide full software image 113 to device 102. According to an example embodiment, software image server 112 may configure device 102 with full software image 113, including operating system 150 and applications 152, which may replace at least a portion of provisioning software image 111 as configured on device 102.

Figure 3:
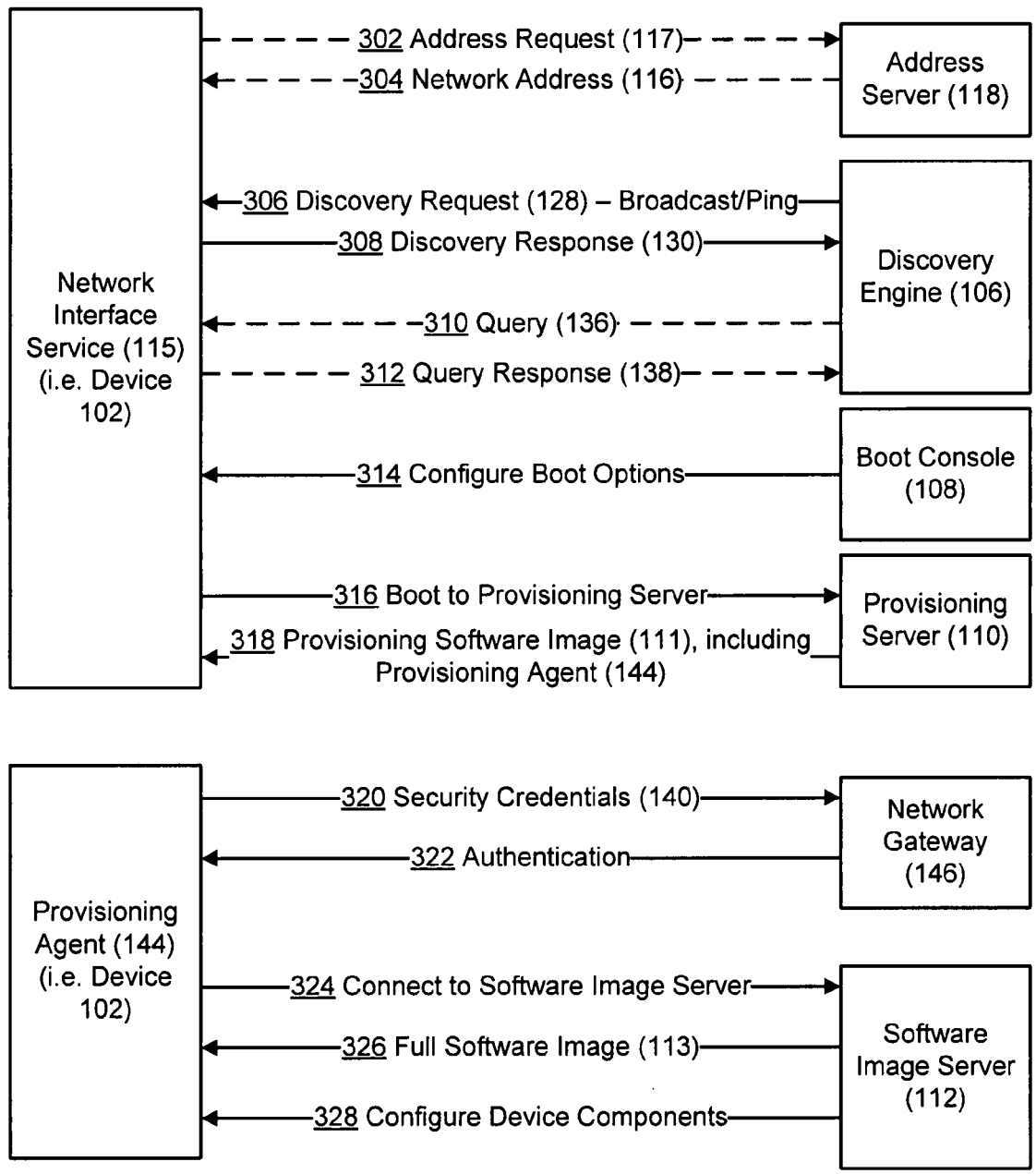
FIG. 3 is a block diagram illustrating an example flow associated with remotely provisioning a device via a network according to an example embodiment.

FIG. 3 is a block diagram illustrating an example flow associated with remotely provisioning a device via a network according to an example embodiment.

At 302, address request 117 may be broadcast by network interface service 115 (i.e. device 102). Address request 117 may include for example a request for an IP address to identify device 102 on network 104. Then for example, address server 118 may receive address request 117.

At 304, address server 114 may assign network address 116 to device 102. For example, address server 114, upon receiving address request 120, may determine network address 116, from one of one or more available addresses (e.g. 120), to assign to device 102.

At 306, discovery engine 106 may transmit discovery request 128. As discussed above, discovery engine 106 may either transmit discovery request 128 to one or more addresses concurrently using a broadcast protocol (e.g. 122) or successively using a ping protocol (e.g. 124). Either protocol may be used one-time or periodically.

At 308, discovery response 130 may be received by discovery engine 106. For example, network interface service 115, after receiving discovery request 128, may respond to discovery engine 106 with discovery response 130.

At 310, discovery engine 106 may transmit query 136 to device 102. For example, discovery engine 106 may determine network address 116 from discovery response 130 and may provide query 136 to determine configuration information associated with the boot options (e.g. 134) of device 102.

At 312, discovery engine 106 may receive query response 138. For example, network interface service 115 may transmit query response 138 to discovery engine 106 in response to query 136, including a determination as to whether the boot options are remotely configurable.

At 314, boot console 108 may configure the boot options of device 102. For example, after a determination that the boot options of device 102 are remotely configurable, boot configuration logic (e.g. 158) may configure the boot options of device 102. Then for example, after configuring the boot options, boot console 108 may cause device 102 to reboot.

At 316, device 102 may boot to provisioning server 110. For example, device 102 may boot based on the boot options as configured by boot console 108, which may cause communication between device 102 and provisioning server 110.

At 318, provisioning server 111 may configure device 102 with provisioning software image 111, including provisioning agent 144. According to an example embodiment, provisioning agent 144 may replace and/or work in conjunction with network interface server 115 in completing the remaining configuration and communication processes.

At 320, network gateway 146 may receive security credentials 146. For example, provisioning agent 144 may provide or exchange security credentials 146 with network gateway 146.

At 322, network gateway 146 may authenticate device 102. For example, network gateway may verify security credentials 140 and/or other information and allow device 102 to communicate with software image server 112. According to an example embodiment, communications with software image server 112 may be performed via secured communication (148), including data encryption and/or other security measures intended to prevent unauthorized devices from accessing software image server 112.

At 324, software image server 112 may receive a connection from device 102. For example, provisioning agent 148 may cause device 102 to securely connect to software image server 112.

At 326, software image server 112 may configure device 102 with full software image 156. According to an example embodiment, full software image 156 may replace the previously configured provisioning software image 111.

At 328, software image server 112 may configure one or more device components (e.g. 156) of device 102.

Figure 4:
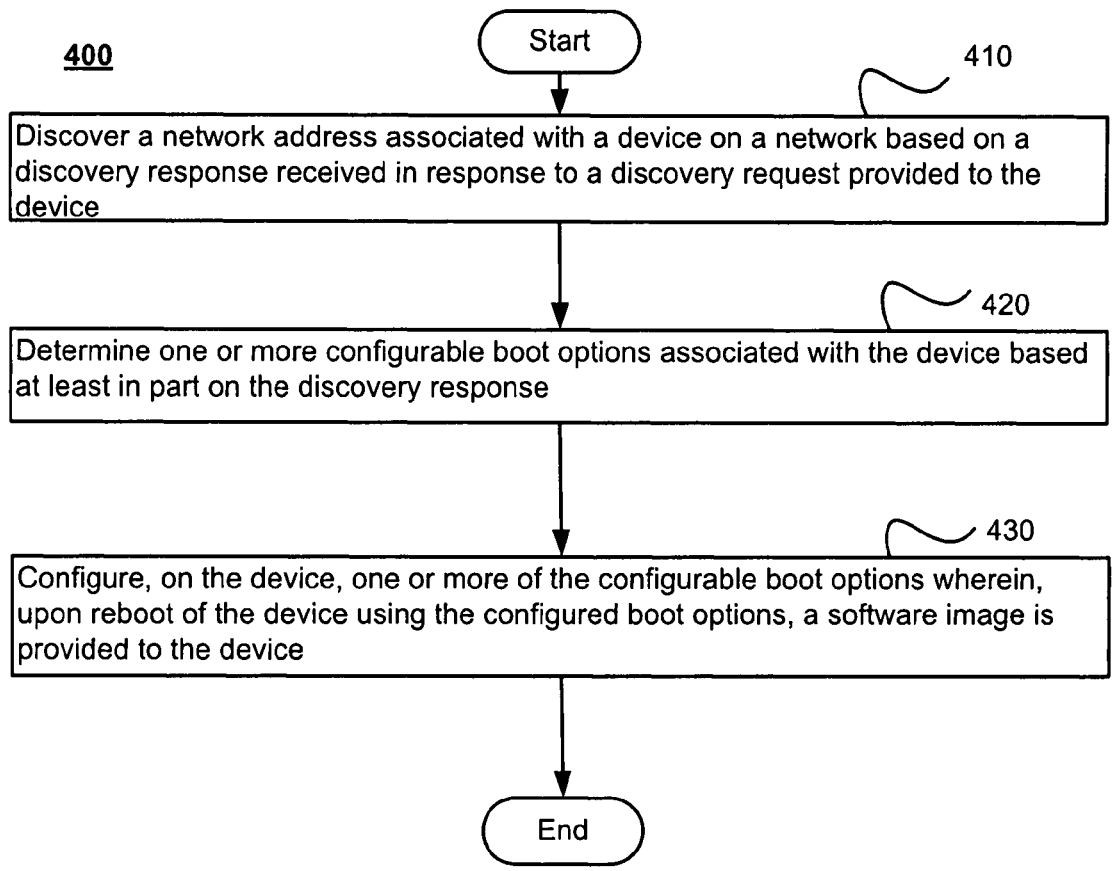
FIG. 4 is a flow chart illustrating remote provisioning of a device via a network according to an example embodiment.

FIG. 4 is a flow chart illustrating remote provisioning of a device via a network according to an example embodiment.

At 410, a network address associated with a device on a network may be discovered based on a discovery response received in response to a discovery request provided to the device. For example, discovery engine 106 may transmit discovery request 128 using discovery protocol 118 (e.g. broadcast protocol 122 or ping protocol 124) via network 104 to device 102. Discovery engine 106 may determine network address 116 based on a receipt of discovery response 130 as transmitted by device 102 based on the receipt of discovery request 128.

At 420, one or more configurable boot options associated with the device may be determined, based at least in part on the discovery response. For example, device 102 may respond to query 132, which may be included with discovery request 128, with query response 136, which may be included with discovery response 130. Then for example, based on query response 136, discovery engine 106 may determine about the configurability of boot options 134.

At 430, one or more of the configurable boot options, on the device, may be configured, wherein upon reboot of the device using the configured boot options, a software image is provided to the device. For example, boot configuration logic 138 of boot console 108 may configure boot options 134 of device 102, wherein upon reboot of device 102, device 102 may boot to provisioning server 110 and/or software image server 112. Then for example, provisioning server 110 or software image server 112 may provide and/or configure device 102 with a software image (e.g. provisioning software image 111 or full software image 113, respectively).

While certain features of the described implementations have been illustrated as described herein, many modifications, substitutions, changes and equivalents will now occur to those skilled in the art. For example, many of the described implementations refer to single components of a system, when in other implementations multiple such components may exist within the system and those components may work in series and/or in parallel. Also for example, many of the described implementations and embodiments refer to speech, speech-related data, and speech processing, when in other implementations or embodiments such examples may be extended to include other types of audio, audio-related data and audio processing as well. It is, therefore, to be understood that the appended claims are intended to cover all such modifications and changes as fall within the true spirit of the embodiments of the invention.

What is claimed is:

1. A method comprising:
sending, from a server to a network address, a discovery request inquiring whether a device has at least one remotely configurable boot option;
receiving, at the server, a response from the device having the network address, wherein the response indicates whether the device has at least one remotely configurable boot option;
if the response indicates that the device has at least one remotely configurable boot option, automatically remotely configuring, by the server, the at least one remotely configurable boot option of the device so that the device boots to an image server; and
configuring, by the image server, a software image on the device upon reboot of the device based on the at least one remotely configured boot option.

2. The method of claim 1 wherein the device includes a network interface service configured to communicate via a network.

3. The method of claim 2 wherein the network interface service broadcasts an address request to the network and the network address is assigned to the device in response to the address request.

4. The method of claim 1 wherein sending the discovery request comprises broadcasting a plurality of discovery requests to a plurality of addresses associated with the network, including the network address associated with the device.

5. The method of claim 4, wherein broadcasting a plurality of discovery requests comprises:
transmitting a first plurality of discovery requests to the plurality of network addresses;

listening, for a period of time, for one or more responses to the plurality of discovery requests; and transmitting, upon expiration of the period of time, a second plurality of discovery requests to at least a portion of the plurality of network addresses.

6. The method of claim 1 wherein sending the discovery request to the network address comprises pinging the network address.

7. The method of claim 6, further comprising:

pinging a first address associated with the network;

listening for a discovery response from a device associated with the first address; and pinging a second address associated with the network upon expiration of a period of time.

8. The method of claim 1 wherein:

automatically remotely configuring the at least one configurable boot option from the server comprises configuring the at least one configurable boot option so that the device boots to a provisioning server, and the method further comprises the provisioning server configuring security credentials on the device upon reboot of the device based on the at least one configured boot option.

9. The method of claim 1 wherein:

automatically remotely configuring the at least one configurable boot option from the server comprises configuring the at least one configurable boot option so that the device boots to a provisioning server, and the method further comprises the provisioning server configuring a provisioning agent on the device upon reboot of the device based on the at least one configured boot option, the provisioning agent being configured to locate and communicate with a network gateway.

10. An apparatus comprising:

a discovery server configured to:

send a discovery request to a network address, the discovery request inquiring whether at least one boot option of a device is remotely configurable; and receive a response from the device having the network address, wherein the response indicates whether at least one boot option of the device is remotely configurable; and a boot configuration server configured to automatically remotely configure the at least one configurable boot option of the device if the response indicates that the device has at least one configurable boot option, the at least one configurable boot option comprising an option to cause the device to boot to a provisioning server and cause the device to receive a provisioning software image from the provisioning server.

11. The apparatus of claim 10 wherein the at least one configurable boot option comprises a configurable location from which the device will boot.

12. The apparatus of claim 10 wherein the at least one configurable boot option comprises a selecting or specifying a drive connected to the device from which the device will boot.

13. The apparatus of claim 10 wherein the at least one configurable boot option comprises identifying a server from which the device will receive a software image.

14. The apparatus of claim 10 wherein the at least one configurable boot option comprises identifying a server from which the device will receive a provisioning software image, the provisioning software image including security credentials, a provisioning operating system, and a provisioning agent.

* * * * *